(12) United States Patent
Gandolph et al.

(10) Patent No.: US 7,978,962 B2
(45) Date of Patent: Jul. 12, 2011

(54) METHOD FOR CONTROLLING AN OPTICAL PICK-UP FOR READING DATA STREAMS FOR SIMULTANEOUS REPRODUCTION

(75) Inventors: Dirk Gandolph, Ronnenberg (DE); Harald Schiller, Hannover (DE); Jobst Hörentrup, Hannover (DE); Ralf Ostermann, Hannover (DE); Hartmut Peters, Barsinghausen (DE)

(73) Assignee: Thomson Licensing, Boulogne-Billancourt (FR)

( * ) Notice: Subject to any disclaimer, the term of this patent is extended or adjusted under 35 U.S.C. 154(b) by 1261 days.

(21) Appl. No.: 10/552,037

(22) PCT Filed: Mar. 22, 2004

(86) PCT No.: PCT/EP2004/002999
§ 371 (c)(1),
(2), (4) Date: Oct. 27, 2006

(87) PCT Pub. No.: WO2004/088660
PCT Pub. Date: Oct. 14, 2004

(65) Prior Publication Data
US 2007/0274681 A1    Nov. 29, 2007

(30) Foreign Application Priority Data
Apr. 2, 2003 (EP) .................................. 03007611

(51) Int. Cl.
*H04N 5/93* (2006.01)
(52) U.S. Cl. ........................................................ 386/354
(58) Field of Classification Search ............... 386/46, 386/95–99, 101, 109, 111, 112, 124–126, 386/353–357
See application file for complete search history.

(56) References Cited

U.S. PATENT DOCUMENTS

| 5,249,271 | A |   | 9/1993 | Hopkinson et al. |
| 5,521,918 | A | * | 5/1996 | Kim .............................. 370/428 |
| 5,543,861 | A |   | 8/1996 | Harradine et al. |
| 6,035,092 | A | * | 3/2000 | Fujinami ......................... 386/47 |
| 6,643,449 | B1 | * | 11/2003 | Nagata et al. ................. 386/248 |
| 2006/0233203 | A1 | * | 10/2006 | Iwamura ....................... 370/516 |

FOREIGN PATENT DOCUMENTS

| EP | 0552806 | 1/1993 |
| EP | 0932153 | 7/1999 |
| EP | 1011268 | 6/2000 |
| EP | 1328118 | 7/2003 |

OTHER PUBLICATIONS

Search Report Dated Jun. 4, 2004.

* cited by examiner

*Primary Examiner* — David E Harvey
(74) *Attorney, Agent, or Firm* — Robert D. Shedd; Robert B. Levy; Jorge Tony Villabon

(57) ABSTRACT

A method for optimizing a scheduler for an optical pick-up reduces the pick-up jump frequency and the initial start-up time for reproduction. The pick-up reads data streams from different files on an optical storage medium, e.g. Blu-Ray disc, and buffers the data streams in separate buffers, e.g. for video, audio and subtitles. Buffer sizes are optimized when the video buffer is as small as possible, i.e. large enough to bridge the pick-up access and read times for the other streams, and the buffers the lower rated streams are extended such that the pick-up access frequency for lower rated streams is an integer multiple of the pick-up access frequency for the highest rated stream, usually the video stream. Initial start-up time is minimized by filling the buffers initially only to a minimum required level.

11 Claims, 3 Drawing Sheets a)

b)

METHOD FOR CONTROLLING AN OPTICAL PICK-UP FOR READING DATA STREAMS FOR SIMULTANEOUS REPRODUCTION

FIELD OF THE INVENTION

This invention relates to a method for operating a scheduler for an optical pick-up. The pick-up reads data streams from an optical storage medium, wherein the data streams belong to different data types like audio, video, subtitles or other data, and are distributed to several files on the storage medium.

BACKGROUND

Pre-recorded or self-recorded optical discs may support "Out Of Multiplex" (OOM) formats. Out of multiplex is a format that stores different streaming components, e.g. video, audio and subtitles, on different locations on the disc, i.e. different files. This is possible with various standardized media, e.g. Blu-ray disc or DVD. Also, a video technique known as multi-angle may be implemented. Multi-angle means that a video film may contain for certain scenes various alternative view angles, all running at a parallel time axis, which are selectable by the user and may be integrated seamlessly into the video.

To playback an OOM source, the optical pick-up reads all required streams from the different locations, before the playback device decodes the streams by their specific decoders for synchronous representation. That means that the pick-up has to jump from stream to stream in order to serve all decoders simultaneously, without noticeable interruption of the presentation. Usually, a pick-up contains an actuator carrying an optical sensor, and the pick-up is movable by a mechanical drive for raw adjustment, while the actuator is separately movable for fine adjustment without a mechanical drive.

The straight forward solution for providing OOM technology with optical drives is buffer technique: additional stream buffers 61, 62, 63 serve to bridge the times that are needed for jumping to the other requested streams and reading them 53. A typical example comprises three streams: video, audio and subtitles. E.g. the video buffer is dimensioned such that jumping to the audio stream, loading of the audio buffer, jumping to the subtitle stream, loading of the subtitle buffer and jumping back to the video stream can be executed without the video buffer running empty. The other buffers, e.g. for audio and subtitles, are dimensioned analogously.

SUMMARY OF THE INVENTION

One problem arising from the fact that multiple files must be read simultaneously is the high pick-up jump frequency causing noise and wastage due to the mechanical drive. A further problem is the delay appearing during seamless video angle switches. The delay is the time needed from requesting the video angle change until seeing the other video angle. It is determined mainly by the video buffer size, or by the amount of time until the video buffer has run empty and the new content reaches the video decoder. The same applies to the start up of OOM decoding. The time passing by from pressing the start button until effectively starting the display is quite long, since all buffers must be filled from scratch.

A problem to be solved by the invention is to provide a scheduling method for controlling a pick-up such that a reduction of the pick-up jump frequency is achieved. This problem is solved by the method disclosed in claim 1. An apparatus that utilizes the method is disclosed in claim 9.

Another problem to be solved by the invention is to reduce the delay times required at presentation start up. This problem is solved by the method disclosed in claims 5-7.

A buffer filling method that provides the shortest possible delay during initialization is disclosed in claim 6.

Advantageously, a method for reducing the delay times required for angle switch can be included.

The inventive method leads to a lower pick-up jump frequency and thus achieves noise reduction and improved pick-up durability. This is reached by asymmetric buffer dimensioning. Another idea disclosed herein provides a technique for OOM decoding that reduces the switching time for seamless angle changes. For a HDTV stream, the typical application of blu-ray disc, the buffers are quite large. The large buffers cause a long delay for the user waiting for a requested angle change to get visible, which delay can be reduced by the inventive method. The same problem arises for the start-up of OOM decoding, and can be improved by the disclosed method.

One gist of the invention is to asymmetrically enlarge the buffers of the lower rated streams while keeping the highest rated stream buffer as small as possible. A typical application is the OOM decoding of high definition (HD) video, audio and subtitles. When the three streams for video, audio and subtitle are read, the buffers 62, 63 of the lower rated streams audio and subtitle are enlarged in such a way that the video buffer 61 can be filled multiple times before the re-filling of audio and subtitle buffers becomes necessary. Enlarging the buffer sizes for audio and subtitle causes enlargement of the time difference between pick-up jumps, and thus lowers pick-up jump frequency. Filling the video buffer multiple times in the meantime does not increase the pick-up jump frequency, since it requires only actuator movements but no pick-up jumps. Therefore the resulting pick-up jump frequency is lower.

Another gist of the invention is the minimization of switching delay time for seamless video angle switches. This is reached by the introduction of angle switch labels within the video buffer. The angle switch labels are used to determine those parts of the video buffer which are obsolete in case of an angle switch, and can be removed, or overwritten, without the risk of a buffer under run. When the obsolete content has been removed from the video buffer, the buffer may be filled with the requested new content instead. Overwriting the obsolete data performs both steps simultaneously. This controlled replacement of obsolete content of the video buffer reduces the video angle switch time, because the decoder does not need to process the obsolete content.

In particular, a method is disclosed for controlling a pick-up for reading data streams from a storage medium, usually an optical disc, with the data streams belonging to different data types like audio, video or subtitles, and therefore having different constant or variable data rates. Further, the data streams are distributed to more than one file on said storage medium and must be separately buffered after reading 54 because they are used for simultaneous reproduction. Since there is only one pick-up, the amount of buffered data relating to any of said data streams will be at least such that subsequent processing, e.g. decoders, can be provided with the buffered data during the time required for accessing and reading the other data streams of the other data types. The method comprises requesting the pick-up to read more data from a data stream when the remaining amount of buffered data relating to said data stream is below a threshold 52, buffering a first data stream of a first data type, the data stream having the highest data rate of all said data streams, e.g. video, and buffering at least a second data stream of a second data type, e.g. audio, with the amount of buffered data being such that the time between read requests related to said second data type is a multiple of the time between read requests related to said first data type.

Advantageously, the invention can also be used to optimize the partitioning of a given amount of buffering space for the described application.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1a) a bit stream buffer for bridging the jump and load times of three OOM streams, being dimensioned conventionally.

DETAILED DESCRIPTION OF THE INVENTION

In the following, a detailed description of the invention including a detailed analysis of the problem is given.

OOM decoding is mainly influenced by the following mutually dependent parameters:
the pick-up maximum channel bit rate R,
the pick-up access time $T_{acc}$,
the pick-up jump frequency $f_{jump}$,
the resulting total buffer size $B_\Sigma$,
the number of separate streams N,
and the individual stream bit rate $r_i$.

Figure 1:
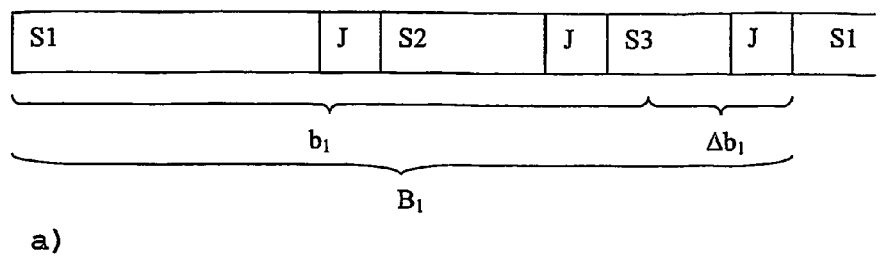
FIG. 1b) a bit stream buffer for bridging the jump and load times of three OOM streams, containing additional extension buffer space according to the invention.
Figure 1:
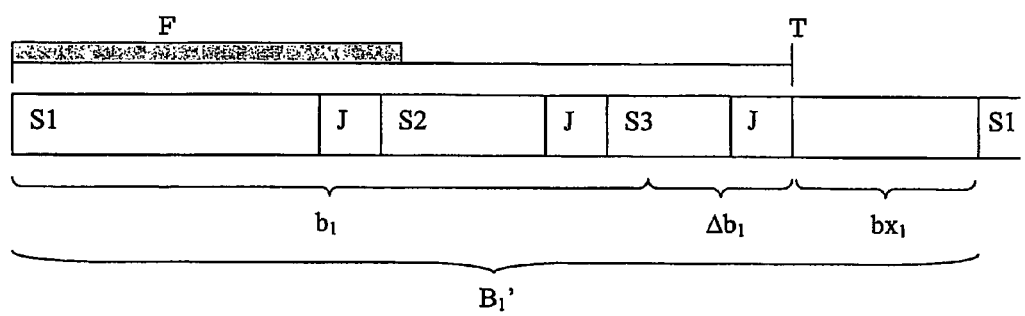

The general approach for OOM decoding is to buffer all jump and loading times requested to serve all N streams decoded. FIG. 1a) shows an example for three streams. The base buffer $b_1$, e.g. for video, is enlarged by the bridge buffer $\Delta b_1$ which is dimensioned in such a way that the following operations can be executed while the video buffer is being read, but without the video buffer running empty: jumping J to the audio stream, loading S2 the audio buffer, jumping J to the subtitle stream, loading S3 the subtitle buffer and jumping J back to video stream. S1 is the time required to load the complete video buffer $b_1, \Delta b_1$ itself. The base buffers of audio and subtitle are enlarged in the same way by $\Delta b_2$ and $\Delta b_3$.

The buffer sizes can be calculated to:

$B_i = b_i + \Delta b_i$ (eq. 1.0) Buffer size per stream $B = \Sigma b_i$ (eq. 1.1) Total base buffer size $\Delta B = \Sigma \Delta b_i$ (eq. 1.2) Total extension buffer size $B_\Sigma = B + \Delta B = \Sigma b_i + \Sigma \Delta b_i$ (eq. 1.3) Total buffer size The buffer filling time for a single stream buffer is determined by the equation:

$$T_{fill,i} = \frac{B_i}{(R - r_i)} \quad \text{(eq. 2)}$$

When accumulating all jump and filling times for three bit streams, a linear equation system (LES) can be set up, and the resulting bridge buffers $\Delta b_i$ can be determined. The resulting LES for N streams can be written in matrix form as:

$$\begin{pmatrix} \Delta b_1 \\ \Delta b_2 \\ \vdots \\ \Delta b_N \end{pmatrix} = \begin{pmatrix} \frac{1}{r_1} & \frac{1}{r_2 - R} & \cdots & \frac{1}{r_N - R} \\ \frac{1}{r_1 - R} & \frac{1}{r_2} & & \frac{1}{r_N - R} \\ \vdots & & \ddots & \vdots \\ \frac{1}{r_1 - R} & \frac{1}{r_2 - R} & & \frac{1}{r_N} \end{pmatrix}^{-1} \begin{pmatrix} N \cdot T_{acc} - \sum_{i \neq 1}^{N} \frac{b_i}{r_i - R} \\ N \cdot T_{acc} - \sum_{i \neq 2}^{N} \frac{b_i}{r_i - R} \\ \vdots \\ N \cdot T_{acc} - \sum_{i \neq N}^{N} \frac{b_i}{r_i - R} \end{pmatrix} \quad \text{(eq. 3)}$$

To supply N OOM streams, the resulting pick-up jump frequency can be estimated to:

$$f_{jump} \approx \frac{N}{\sum_{i=1}^{N}(T_{acc} + T_{fill,i})} = \frac{1}{T_{acc} + \frac{1}{N}\sum_{i=1}^{N}\frac{B_i}{(R-r_i)}} \quad \text{(eq. 4)}$$

Since the $r_i$ are variable bit rates (VBR), eq. 4 is an estimation for an average value. Further, the effective jump frequency may be higher because the different buffers will not always run completely empty, i.e. the effective $B_i$ are smaller.

Eq. 3 and eq. 4 describe a simple round-robin scheduler: after having filled a buffer completely, the scheduler switches to the next buffer. This continues until all stream buffers have been served, and the scheduler starts a new loop through all the streams. To avoid worst-case buffer underflow when having high read data rates, the round-robin scheduling may be done independently from the individual buffer fullness. This means a constant pick-up jump frequency, being higher than actually necessary.

According to the invention, the pick-up jump frequency can be reduced when the bridging stream buffers are further enlarged and another than the round-robin scheduler model is used. This other scheduler model, according to the invention, could be a free running scheduler 64 as described by the following:
- every OOM stream has its own buffer 61,62,63,
- every OOM buffer is filled upon request, when reaching a threshold, e.g. "nearly empty",
- a queuing mechanism is used to handle concurrent requests, i.e. each request for filling an OOM buffer is queued once.

For the free running scheduler according to the invention, the resulting pick-up jump frequency is determined by accumulating the individual pick-up jump frequencies and is calculated by:

$$f_{jump} = \sum_{i=1}^{N} f_i \qquad (eq. 5)$$

FIG. 1b) shows a scheme of a further enlarged stream buffer. The buffer $b_1, \Delta b_i$ is extended by an extension buffer $bx_1$. While the extension buffer is being read, the pick-up is not used. This effects a reduction of the individual streams pick-up jump frequency, and thus influences the resulting pick-up jump frequency according to eq. 5. Using an extension buffer changes eq. 1.0, which is now $$B_i = b_i + \Delta b_i + bx_i \qquad (eq. 6)$$

But the buffer extension $bx_i$ has two drawbacks, the first being that it requires more memory, and the second being that it influences the necessary bridge buffer $\Delta b_2, \Delta b_3$ for the other stream buffers, due to the additional fill time required for $bx_1$. Enlarging the other bridge buffers $\Delta b_2, \Delta b_3$ by adding extension buffers $bx_2, bx_3$ ensures an in time response of the free running scheduler for any stream buffer fill request. The best compromise for the size of the bridge buffers, according to the invention, is outlined in the following.

First the individual streams pick-up jump frequencies $f_i$ are determined. After the free running scheduler has filled the stream buffer $\Delta b_i + b_i + bx_i$ completely, the buffer continues to be read and runs empty. When reaching a threshold T, e.g. $\Delta b_i + b_i$, the buffer may send a refill request 52 to the scheduler 64, and the scheduler 64 queues the request. The stream buffer is further being emptied, until the scheduler serves the request. It is assumed for this example that typically half of the remaining buffer $(\Delta b_i + b_i)/2$ runs empty before the scheduler acts. The remaining buffer filling, at the time when the request is served, is shown in FIG. 1b) by the gray area F. The following calculation applies for the individual streams pick-up jump frequency:

$$f_i = (T_{fill,i} + T_{empty,i} + T_{acc})^{-1} \qquad (eq. 7.1)$$

$$f_i = \left( \frac{\frac{b_i + \Delta b_i}{2} + bx_i}{R - r_i} + \frac{\frac{b_i + \Delta b_i}{2} + bx_i}{r_i} + T_{acc} \right)^{-1} \qquad (eq. 7.2)$$

$$f_i = \frac{2 \cdot r_i \cdot (R - r_i)}{b_i \cdot R + \Delta b_i R + 2 \cdot bx_i \cdot R + 2 \cdot T_{acc} \cdot r_i \cdot R - 2 \cdot T_{acc} \cdot r_i^2} \qquad (eq. 7.3)$$

$T_{empty,i}$ is the time in which the buffer for stream i is being read, without being filled. Enlarging the extension buffers $bx_i$ as described by eq. 5 and eq. 7 can reduce the resulting pick-up jump frequency.

According to the invention it is particularly advantageous to enlarge the extension buffers $bx_i$ asymmetrically, i.e. select each extension buffer $bx_i$ individually, such that the highest pick-up jump frequency $f_{i,r=max}$ is a multiple of the resulting individual pick-up jump frequencies $f_{i,r\neq max}$. This is expressed by the following equations:

$$f_{i,r=max} = \lambda \cdot f_1 = \lambda \cdot f_2 = \ldots = \lambda \cdot f_{n,n\neq i} \ldots = \lambda \cdot f_N \qquad (eq. 8.1)$$

$$f_{Video} = \lambda \cdot f_{Audio} = \lambda \cdot f_{Subtitle} \qquad (eq. 8.2)$$

In eq. 8.1, $f_1$ is a function of $bx_1$ etc., and $\lambda$ is the asymmetry factor. When the relations of eq. 8.1 are chosen in such a way that the stream with the highest bit rate, typically the video stream, has the highest jump frequency $f_{i,r=max}$, then this leads to a reduction of the resulting pick-up jump frequency, while using the same total amount of extension buffer $B_\Sigma$ as previous scheduling systems. This optimizes the usage of extra buffer, and therefore saves the most bytes for extra buffer. The stream buffers for the lower bit rate streams are individually enlarged to meet the asymmetry factor $\lambda$.

Eq. 8.2 is an example for a typical blu-ray disc application for OOM decoding of multimedia content, including e.g. HD video, audio and subtitle. When the three streams for video, audio and subtitle are read, and the buffers of the lower rated streams are enlarged according to the invention, then the video buffer can be filled $\lambda$ times before the audio and subtitle buffers need to be refilled. By this enlargement of buffer sizes for the audio and subtitle streams, the time between pick-up jumps can be longer, and thus the individual streams pick-up jump frequency lower. The $\lambda$ times filling of the video buffer in the meantime does not increase the pick-up jump frequency, as it requires only actuator movements of the pick-up, no jumps. Thus the result is a lowered pick-up jump frequency.

The improved resulting jump frequency can be calculated to:

$$f_{jump}^* \leq f_{jump} = \sum_{i=1}^{N} f_i \qquad (eq. 9.1)$$

$$f_{jump}^* = \min\left(\frac{N-1}{\lambda}; 1\right) \cdot f_{r=max} + \left(\frac{N-1}{\lambda}\right) \cdot f_{r=max} \qquad (eq. 9.2)$$

In a typical application example, $f_{r=max}$ corresponds to the video stream buffer. By combining eq. 3 and eq. 8.2 for three streams, a new LES can be constructed, containing further the values for the extension buffers $bx_2, bx_3$ of audio and subtitle. The LES is $$(\Delta b_1 \Delta b_2 \Delta b_3 bx_2 bx_3) = M^{-1}(\lambda) \times v(\lambda) \qquad (eq. 10.1)$$

$$M(\lambda) = \begin{pmatrix} 1 & \frac{-r_1}{R-r_2} & \frac{-r_1}{R-r_3} & \frac{-r_1}{R-r_2} & \frac{-r_1}{R-r_3} \\ \frac{-r_2}{R-r_1} & 1 & \frac{-r_2}{R-r_3} & 0 & \frac{-r_2}{R-r_3} \\ \frac{-r_3}{R-r_1} & \frac{-r_3}{R-r_2} & 1 & \frac{-r_3}{R-r_2} & 0 \\ 0 & \frac{R}{r_2 \cdot (R-r_2)} & \frac{-R}{r_3 \cdot (R-r_3)} & \frac{2 \cdot R}{r_2 \cdot (R-r_2)} & \frac{-2 \cdot R}{r_3 \cdot (R-r_3)} \\ \frac{R}{r_1 \cdot (R-r_1)} & 0 & \frac{-R}{\lambda \cdot r_3 \cdot (R-r_3)} & 0 & \frac{-2 \cdot R}{\lambda \cdot r_3 \cdot (R-r_3)} \end{pmatrix} \quad \text{(eq. 10.2)}$$

$$v(\lambda) = \begin{pmatrix} r_1 \cdot 3 \cdot T_{acc} + \frac{r_1 \cdot b_2}{R-r_2} + \frac{r_1 \cdot b_3}{R-r_3} \\ r_2 \cdot 3 \cdot T_{acc} + \frac{r_2 \cdot b_1}{R-r_1} + \frac{r_2 \cdot b_3}{R-r_3} \\ r_3 \cdot 3 \cdot T_{acc} + \frac{r_3 \cdot b_1}{R-r_1} + \frac{r_3 \cdot b_2}{R-r_2} \\ \frac{-R \cdot b_2}{r_2 \cdot (R-r_2)} + \frac{R \cdot b_3}{r_3 \cdot (R-r_3)} \\ 2 \cdot T_{acc} \cdot \left(\frac{1}{\lambda} - 1\right) - \frac{R \cdot b_1}{r_1 \cdot (R-r_1)} + \frac{R \cdot b_3}{\lambda \cdot r_3 \cdot (R-r_3)} \end{pmatrix} \quad \text{(eq. 10.3)}$$

Both the matrix $M(\lambda)$ and the disturbing $v(\lambda)$ are functions of the asymmetry $\lambda$. But $\lambda$ cannot be chosen arbitrarily. Since it modifies the time that is required to fill the other buffers, it is limited by the condition $$T_{empty,i} - 3 \cdot T_{acc} - \sum_{n=1, n \neq i}^{N} T_{fill,n} \geq 0 \quad \text{(eq. 11)}$$

This means that the time that can be bridged by a buffer $T_{empty,i}$ without refilling must be equal or higher than the time that is required to access the other streams, read them and store them to their respective buffers. Using the LES eq. 10 and considering the conditions of eq. 11, the bridge buffers $\Delta b_i$ and the extension buffers $bx_i$ can be determined.

Figure 2:
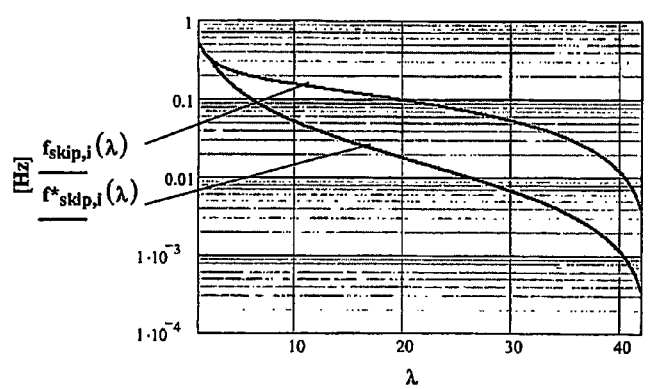
FIG. 2 a qualitative example for the resulting pick-up jump frequency, comparing equally shared extension buffers and asymmetrically shared extension buffers.

The gain reached by the asymmetry $\lambda$ for a typical application, like a movie from blu-ray disc, is depicted in FIG. 2. It shows the resulting pick-up jump frequency $f_{skip,i}$ of a scheduling system that uses equally shared extension buffers, as compared to the resulting pick-up jump frequency $f^*_{skip,i}$ of a system according to the invention that uses asymmetric extension buffers, both being functions of the variable $\lambda$. For the shown reasonable values of $\lambda$, i.e. $\lambda$ being 2 or more, the pick-up jump frequency for the inventive scheduler is lower than for the conventional scheduler. The diagram is based on typical values for parameters, i.e. $T_{acc}$=0.8 s, R=54 Mbps, $r_{video}$=40 Mbps, $r_{Audio}$=640 kbps, $r_{Subtitle}$=2 kbps.

Another gist of the invention is the reduction of switching delay time for seamless video angle switches. For OOM decoding a seamless video angle switch can be compared to a change of the video stream file. This must be done seamlessly for the user, i.e. without any picture artifacts, blanking or pausing in video. Seamless video angle switches are possible only at specific byte positions in the stream. Those positions are indicated by navigation information related to the stream, e.g. group-of-picture (GOP) boundaries for the case of MPEG.

Figure 3:
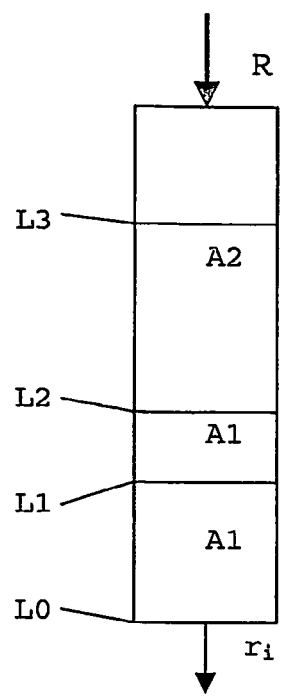
FIG. 3 a conventional video buffer model during video angle switch.

FIG. 3 shows a conventional video stream buffer, being filled with the pick-up bit rate R and simultaneously being emptied with the decoding bit rate $r_i$. On average, | the filling rate R must be larger or equal than the decoding bit rate $r_i$, to prevent the buffer from running empty. When reproducing a video, a stream related to a first view angle A1 is loaded into the buffer and reproduced. After a certain time of reproduction, the user may request a video angle change. The buffer has at this time a remaining filling level L1. When the scheduler has received this request and the video buffer is to be refilled again, the pick-up will not immediately jump to the other video stream related to the second view angle A2. Instead, the pick-up continues reading further bytes of the first view angle A1, until a seamless connection is detected in the bit stream; at this time the buffer has a new fill level L2, containing a video stream related to the first view angle A1. After reaching the seamless connection, the pick-up may switch the video input stream by jumping to the video stream related to the second view angle A2. Then this stream is loaded into the video buffer, on top of level L2.

In the meantime the decoder is reading data from the video bit buffer at the read position L0, and thus reduces the filling of the buffer, i.e. the levels L1 and L2 are continuously moving down. The effective delay time before switching the video angle is in this scenario determined by the buffer fullness L1 when the video angle change request reaches the scheduler, the length of the new loaded sequence related to the old video angle A1 till a seamless connection is reached, which fills the buffer up to L2, and the video decoding bit rate $r_i$. The effective delay time for the user is determined by the amount of buffer fullness L2−L0 and the video bit rate, as described by $$T_{delay} = \frac{B_{L2-L0}}{r_i} \quad \text{(eq. 12)}$$

To reach a small delay, it is useful to keep the video bit buffer small. This, however, increases the pick-up jump frequency, as described above. Also, the delay time may vary noticeably because the buffer fullness L1 at the time of a request is not determined. An improvement for video angle switching, and advantageously for every channel switching, can be reached by this invention.

Minimizing the buffer size $B_{L2-L0}$ lowers the effective delay time $T_{delay}$. According to the invention, this is reached by the introduction of angle switch labels within the video buffer. Angle switch labels mark possible seamless connection points located within the bit stream. When a scheduler according to the invention fills the video bit buffer, it evaluates the possible seamless connection entry points, given by the related navigation information, and marks the corresponding bit buffer locations with a label. This may be implemented in various ways, e.g. by adding the label to the buffer contents. While the video bit stream is read for decoding, the labels are logically moving down, always being associated to the same seamless connection. In practice, however, a ring buffer or a FIFO may be used, which effectively does not move any bytes in the buffer, and thus the physical position, or address, of the labels remains the same. Therefore it is also possible to store the address of a seamless connection position instead of the label, e.g. in a separate buffer, and locate the seamless connection entry point by comparing the address representing the label with the data read address.

Advantageously, the angle switch labels can be used to easily determine those parts of the video buffer which are obsolete in case of an angle change being requested, and which can be removed without the risk of a buffer under run. According to the invention, the stream switch algorithm described in the following can be employed.

Figure 4:
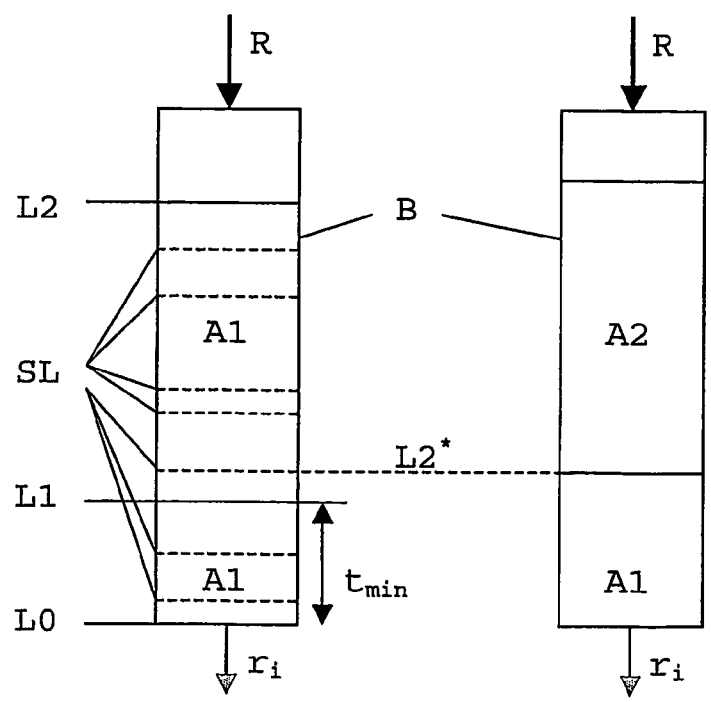
FIG. 4a) a video buffer model according to the invention, before a video angle switch.
FIG. 4b) a video buffer model according to the invention, after a video angle switch.
Figure 5:
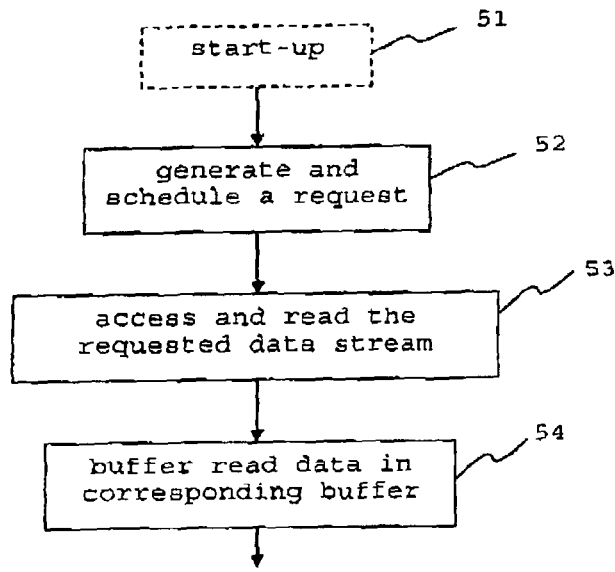
Fig. 5 depicts a flow diagram of a method in accordance with an embodiment of the present invention.
Figure 6:
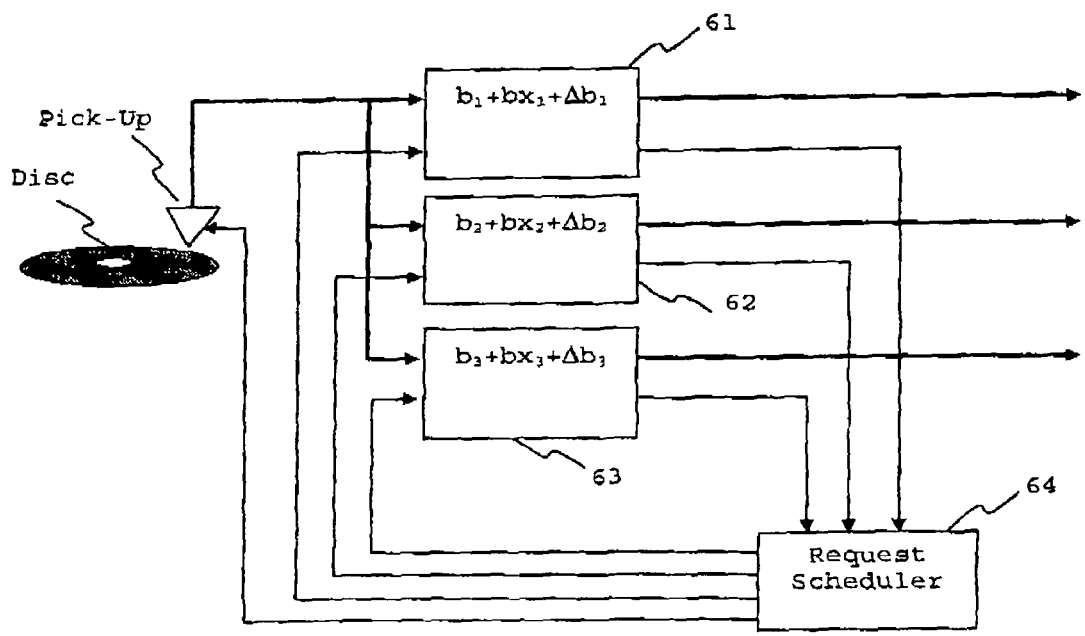
FIG. 6 depicts a high level block diagram of an apparatus for controlling a pick-up in accordance with an embodiment of the present invention.

FIG. 4a) shows an exemplary video buffer, being filled with the pick-up bit rate R and being read with the decoder bit rate $r_i$. When a user requests a video angle change from the current angle A1 to another angle A2, the scheduler evaluates the angle switch labels SL it has currently stored. At the time when the request is processed, the buffer is filled up to a current filling level L2, and may contain various angle switch labels SL. Moving the pick-up to the position where the new video bit stream can be read takes a worst-case minimum time $t_{min}$. During this time $t_{min}$ the video buffer is constantly being read, and may not run empty since the angle switch should be seamless. The buffer space that is required for the amount of data that will be read during that time $t_{min}$ calculates generally according to the following relation:

$$\text{buffer} = r_i \cdot \text{time} \qquad (\text{eq. 13})$$

Since $r_i$ is usually variable, due to VBR, the highest possible rate can be used to cope with the worst case. According to the invention, the buffer size calculated by eq. 13 is added to the current buffer read position L0 to calculate the earliest possible switch position L1. Further, the first angle switch label L2* found above this position L1 is the earliest possible angle switch position. This specific angle switch label L2* is called "bonding label" herein. When the scheduler starts the next video buffer filling process, it may load the new video content of the requested angle A2, starting from the bonding label L2*. Thus, a part of the old buffer content relating to angle A1, namely from the bonding label L2* to the current buffer filling level L2, is deleted, and substituted by the new content relating to angle A2. This situation is shown in FIG. 4b). The effective delay time for the user is determined by the remaining amount of data relating to the old angle A1 and the video bit rate, and calculates to:

$$T^*_{delay} = \frac{B_{L2^*-L0}}{r_i} \qquad (\text{eq. 14})$$

Since $B_{L2^*-L0}$ in eq. 14 is less than $B_{L2-L0}$ in eq. 12, and $r_i$ is the same in both equations, the delay time $T^*_{delay}$ is reduced.

Which of the switch labels can be used as bonding label depends on the minimal possible switching time $t_{min}$. This is the time between the pick-up starting to move to the new video stream and the new video data being buffered. It comprises the pick-up access time $T_{acc}$ mentioned before and intermediate processing times, which are very small compared to $T_{acc}$. Therefore the delay time before actually switching the video angle, as described in eq. 14, can be further reduced by reducing the minimal possible switching time $t_{min}$. According to the invention this can be achieved by modifying the free running scheduler model, as described in the following. When the inventive scheduler receives an angle switch request, it may analyze which stream buffer fill requests are registered in the queue. Depending on the queued fill requests, it may determine the minimum time $t_{min}$ and select the optimal bonding label.

If the buffer contains no switch label, the pick-up may continue to read the old data stream until a switch label is detected, and then switch to the new data stream.

Advantageously, the described mechanism for seamless switching is not restricted to video angle switching, but can be used for any kind of video data switching or user-manipulated reproduction of video data, e.g. if a video scene may be replaced by another video scene. Further, it can be used not only for video data streams, but also for other data streams. Especially, the same mechanism may be used for audio data streams, e.g. to adopt audio reproduction in case of a video angle switch. Moreover, it is possible that various types of switch labels exist, referring only to specific data streams and containing a corresponding indication. In this case the inventive method can be applied analogously.

In a further embodiment of the invention, the processing of requests may be modified even if they are already in the queue when an angle switch request occurs. The scheduler may execute all requests that are in the queue, but stop their execution prematurely, i.e. before the stream buffer is completely filled. This saves more time and decreases the video angle switching delay time. The interrupted stream buffer fill process must however obey to $$T_{fill,min} = \sum_{i=1}^{in\ queue} \left( T_{acc} + \frac{b_i + \Delta b_i}{r_i} \right) \qquad (\text{eq. 15})$$

Eq. 15 means that at least the base buffer $b_i$ and the bridge buffer $\Delta b_i$ must have been be filled before the stream buffer fill request is prematurely interrupted.

Another advantage of the scheduler according to the invention is a special strategy to start the complete OOM decoding of N streams. The normal delay at start-up results from the accumulation of N pick-up jumps and N stream buffer filling times. By using eq. 2 and eq. 6, the start-up delay time is $$T_{startup} = \sum_{i=1}^{N} \left( T_{acc} + \frac{b_i + \Delta b_i + bx_i}{R} \right) \qquad (\text{eq. 16})$$

The denominator is larger than in eq. 2 because the decoding is not running yet, and therefore the buffers are filled quicker.

The optimization of the start-up procedure 51 according to the invention consists of two improvements that are independent from each other, and that are described in the following.

The first improvement concerns the amount of buffer to fill during start-up. When the free running scheduler receives a start up command, it is not loading the OOM stream buffers completely. Similar to the angle switch algorithm described above it fills only a part of the OOM stream buffers, and the bit stream with the highest bit rate is served last. Taking the application example above, the scheduler at start-up fills the OOM stream buffers for the audio or subtitle first, and then fills the OOM video stream buffer. Further, it needs to load only the base buffer $b_i$ and the bridge buffer $\Delta b_i$ for all but the last OOM stream. Also the OOM stream buffer refill requests are set for all but the last OOM stream buffer. Then the last stream buffer may be loaded completely, but decoding for all streams may already start when only the base buffer portion $b_i$ of the last OOM stream buffer has been filled. Thus start-up delay is $$T^*_{startup} = N \cdot T_{acc} + \frac{b_{i=r_{i,max}}}{R} + \sum_{i=1, i \neq r_{i,max}}^{N-1} \frac{b_i + \Delta b_i}{R} \quad \text{(eq. 17)}$$

After this start-up procedure the free running scheduler may work normally as described before, and all queued buffer fill requests may be bridged by the bridge buffers $\Delta b_i$.

The second improvement for a start-up procedure according to the invention concerns the sequence of the OOM stream buffers, i.e. the order in which all but the last OOM stream buffer are loaded. A dominant part of eq. 17 is the pick-up access time $T_{acc}$ that is a physical parameter, namely in the worst case the time required for a full stroke jump, and thus cannot be reduced. According to the invention, the first product of eq. 17 can be reduced, since the first addend "$N \cdot T_{acc}$" is a worst-case value. It can be minimized in the following way.

When the disc is initially read, the reading device determines which files are contained, and their physical location on the disc. Therefore the scheduler may have this information, and select the OOM stream buffer filling order dependant from the physical location of the OOM stream files on the disc. The scheduler may start with the OOM stream buffer at the most outer or most inner physical disc location, depending on which is nearer to the current pick-up position. After that the scheduler loads the physically nearest OOM stream in its respective OOM stream buffer. This is repeated until only the last stream is left, being the one with the highest bit rate. The OOM stream with the highest bit rate is loaded last, independent from its physical location on the disc.

Advantageously, the pick-up will not move more than twice across the full disc when using this start-up procedure.

This corresponds to two full stroke jumps. The resulting start-up delay is $$T^{**}_{startup} = 2 \cdot T_{acc} + \frac{b_{i=r_{i,max}}}{R} + \sum_{i=1, i \neq r_{i,max}}^{N-1} \frac{b_i + \Delta b_i}{R} \quad \text{(eq. 18)}$$

Eq. 18 shows that the dominating addend "$N \cdot T_{acc}$" from eq. 17 is decreased for N>2 and becomes independent from the number of streams treated, thus reducing start-up time.

The invention is also applicable in systems where not all streams require buffering. E.g. there could be another data stream included on the medium, containing data that are not repetitively or not periodically read, e.g. only once at the beginning of a presentation, and that can be processed at the pick-up data rate, and therefore require no buffering.

The inventive method can be employed e.g. by all types of media reproduction devices containing an optical or non-optical pick-up, especially Blu-ray disc players.

Advantageously, the inventive method can also be used to optimize the partitioning of a given amount of buffering space for the described application.

The invention claimed is:

1. A method for controlling a pick-up for reading three or more data streams from a storage medium, the data streams being distributed to more than one file on said storage medium and being separately buffered after reading, and after buffering the data streams being continuously read from the buffers and being used for simultaneous reproduction, wherein said buffers have different individual output data rates and buffer sizes, and wherein the buffer with the highest output data rate being a first buffer relates to a first data stream, the method comprising:

when in a buffer of the separate buffers a remaining amount of buffered data is below a threshold, generating and scheduling a request for the pick-up to read data from the corresponding data stream for filling the buffer that has a remaining amount of buffered data below the threshold, wherein the request indicates the respective data stream to be read, and wherein for each of said buffers an individual average number of requests per time interval is generated that results from its output data rate, its size and said threshold;

upon serving said request, the pick-up accessing the corresponding data stream and reading data from the accessed data stream; and buffering the read data in the corresponding buffer, wherein the amount of data of the first data stream buffered in the first buffer is sufficient for providing continuous buffer output through a time that is required for accessing and reading any one data stream other than the first data stream of the at least three data streams, filling the respective buffer with the read data from said other data stream and accessing and reading the first data stream again, and wherein the amount of buffered data for each of the other data streams is sufficient for providing continuous buffer output through a time that is required for accessing the first data stream, filling and emptying said first buffer a number of times and accessing the respective other data stream again, wherein said number of times of filling the first buffer before the other buffer needs to be refilled is an integer and is at least two.

2. Method according to claim 1, wherein the integer is the same for all other data streams.

3. Method according to claim 2, wherein the data streams comprise at least a video stream, an audio stream and a subtitle stream.

4. Method according to claim 1, wherein during a start-up procedure, first said other data streams and then said first data stream are read from the storage medium.

5. Method according to claim 1, wherein during a start-up procedure, the buffer for the first data stream is filled completely, and the buffers for the other data streams are filled only partially.

6. Method according to claim 1, wherein during a start-up procedure, the order of reading the data streams other than said first data stream from the storage medium is identical, or reverse, to the order that said other data streams have on the storage medium.

7. Method according to claim 1, wherein also data streams are read from said storage medium that are not subsequently buffered.

8. Apparatus for controlling a pick-up for reading three or more data streams from a storage medium, the data streams being distributed to more than one file on said storage medium and being separately buffered after reading, and after buffering the data streams being continuously read from the separate buffers and being used for simultaneous reproduction, wherein said buffers have different individual output data rates and buffer sizes, the apparatus comprising:

a pick-up for reading the data streams from said storage medium;

three or more buffers for buffering each of the three or more data streams separately, wherein the buffer with the highest output data rate being first buffer relates to a first data stream, and for generating, when a remaining amount of buffered data is below a threshold, a request for the pick-up to read data from the corresponding data stream for filling the buffer that has a remaining amount of buffered data below the threshold, wherein the request indicates the data stream to be read, and wherein for each of said buffers an individual average number of requests per time interval is generated that results from its output data rate, its size and said threshold; and a scheduler for scheduling the generated requests, wherein upon serving said request the pick-up accesses the corresponding data stream and reads data from the accessed stream, and wherein the size of the first buffer holding data from the first data stream is sufficient for providing continuous output through a time that is required for accessing and reading any one data stream other than the first data stream from the at least three data streams, filling the respective other buffer with the read data from said other data stream and accessing and reading the first data stream again, and wherein each of the other buffers holding data from each of the other data streams has a size that is sufficient for providing continuous output through a time that is required for accessing the first data stream, filling and emptying the first buffer a number of times and accessing the respective other data stream again, and wherein said number of times of filling the first buffer before the other buffer needs to be refilled is an integer and is at least two.

9. Apparatus according to claim 8, wherein said storage medium is an optical disc and wherein said first data stream is a video data stream and said other data streams comprise audio data and subtitle data.

10. Apparatus according to claim 8, wherein the integer is the same for all said other data streams.

11. Apparatus according to claim 8, wherein, during a start-up first said other data streams and then said first data stream are read from the storage medium.

* * * * *